United States Patent
Paczkowski et al.

(10) Patent No.: US 9,977,914 B1
(45) Date of Patent: May 22, 2018

(54) ELECTRONIC DEVICE SECURITY THROUGH BOOT CYCLES

(71) Applicant: Sprint Communications Company L.P., Overland Park, KS (US)

(72) Inventors: Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 176 days.

(21) Appl. No.: 15/054,130

(22) Filed: Feb. 25, 2016

(51) Int. Cl.
| | |
|---|---|
| *G06F 21/00* | (2013.01) |
| *H04L 9/00* | (2006.01) |
| *G06F 9/44* | (2018.01) |
| *G06F 21/62* | (2013.01) |
| *G06F 11/14* | (2006.01) |

(52) U.S. Cl.
CPC ........ *G06F 21/6218* (2013.01); *G06F 9/4401* (2013.01)

(58) Field of Classification Search
CPC .......................... G06F 21/6218; G06F 9/4401
See application file for complete search history.

(56) References Cited

U.S. PATENT DOCUMENTS

| | | | |
|---|---|---|---|
| 8,112,794 | B2 | 2/2012 | Little et al. |
| 9,282,898 | B2 | 3/2016 | McRoberts et al. |
| 2003/0229514 | A2 | 12/2003 | Brown |
| 2009/0248445 | A1 | 10/2009 | Harnick |
| 2011/0130635 | A1 | 6/2011 | Ross |
| 2017/0104580 | A1* | 4/2017 | Wooten ..................... G06F 8/65 |

FOREIGN PATENT DOCUMENTS

WO    WO 2012138951 A1 * 10/2012 ............. G06F 8/665

OTHER PUBLICATIONS

Rohit Sinha, Sriram Rajamani, Sanjit Seshia, Kapil Vaswani; "Moat: Verifying Confidentiality of Enclave Programs"; Oct. 2015; CCS '15: Proceedings of the 22nd ACM SIGSAC Conference on Computer and Communications Security; Publisher: ACM; pp. 1169-1184.*

* cited by examiner

*Primary Examiner* — Kendall Dolly
*Assistant Examiner* — Courtney Fields (57) ABSTRACT

An electronic device. The electronic device comprises a memory comprising a confidential information region and a non-confidential information region, a processor, and an application stored in the memory. When executed by the processor, the application determines if a reboot has occurred after a most recent power-off boot, where a reboot takes place without removing power from the processor and memory and, in response to determining that the reboot occurred after the most recent power-off boot, prevents access of applications to the confidential information region in the memory.

16 Claims, 7 Drawing Sheets

ELECTRONIC DEVICE SECURITY THROUGH BOOT CYCLES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Logic processors are typically physically configured to read from a specific address or physical location in memory when they are first powered on. Designers and/or manufacturers are responsible for placing an instruction at that specific address that constitutes a handle to access a sequence of instructions—possibly located at an arbitrary address not physically configured in the processor—for initiating the logic processor, loading any system software (i.e., an operating system) into random access memory (RAM), loading application software into RAM, and initiating processing. At least some of this sequence of instructions can be called a boot loader or a boot program. The process of performing these instructions may be referred to as "booting" the logic processor and/or the computer or other electronic device in which the processor is embedded.

Booting when first powered on may be referred to as a power-on boot or a cold boot. Booting can also occur while the logic processor and/or computer system in which the processor is embedded is already powered on, for example when a user initiates a system reset, when an executing application initiates a system reset, or some other element (an error handler) initiates a system reset. This kind of boot may be referred to as a reboot or a warm boot. In the case of a reboot (assuming the system had previously completed a cold boot), memory associated with the system and/or logic processor may not be flushed, and hence reboot instructions may skip some steps that are normally performed during a power-on boot, thereby saving time. For example, an operating system may remain fully or partially installed in RAM and hence may not be loaded during reboot. For example, one or more applications may remain fully or partially installed in RAM and hence may not be loaded during reboot. Avoiding an on-off electrical power cycle, by executing a reboot or system reset instead of a power-on boot (e.g., turning off electrical power and then turning on electrical power), may also avoid electrical current or voltage surges in the logic processor and/or the system in which the processor is embedded. It is known that such electrical current or voltage surges pose elevated failure risks for electronic devices such as logic processors and memory components.

SUMMARY

In an embodiment, an electronic device is disclosed. The electronic device comprises a memory comprising a confidential information region and non-confidential information region, a processor, and an application stored in the memory. When executed by the processor, the application determines if a reboot has occurred after a most recent power-off boot, where a reboot takes place without removing power from the processor and memory and, in response to determining that the reboot occurred after the most recent power-off boot, prevents access of applications to the confidential information region in the memory.

In another embodiment, a method of performing secure computing on a computer system is disclosed. The method comprises determining by the computer system if a reboot of the computer system is in-progress after a most recent power-off boot of the computer system, where a reboot takes place without removing power from a processor of the computer system and a memory of the computer system, wherein the memory comprises a confidential information region and a non-confidential information region and, in response to a finding that the in-progress reboot is after the most recent power-off boot, determining by the computer system if the reboot executed any carry-over instructions. The method further comprises, in response to a finding that the reboot executed carry-over instructions, preventing access by the computer system of applications to the confidential information region in the memory.

In yet another embodiment, an electronic device is disclosed. The electronic device comprises a memory comprising a confidential information region and a non-confidential information region, a processor, and an application stored in the memory. When executed by the processor the application determines if a reboot has occurred after a most recent power-off boot, where a reboot takes place without removing power from the processor and memory and, in response to determining that the reboot occurred after the most recent power-off boot, determines an identity of an application that initiated the reboot. The application further compares the identity of the application that initiated the reboot to a white list of application identities and, in response to determining that the identity of the application is not present in the white list, prevents access of applications to the confidential information region in the memory.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Security provisions of user equipments (UEs) and computer systems may be subverted during reboot operations. For example, a rogue application or a malware may spuriously induce a reboot and exploit the reboot as a vehicle for subverting security provisions. For example, during a reboot (i.e., a warm reboot, versus a power-on boot or a cold boot) volatile random access memory (RAM) may remain powered and data stored in RAM may be preserved across the reboot event. A malware may store subversive data in RAM, induce a reboot, and during reboot or subsequent to reboot the subversive data may be used to subvert the security of the UE or computer system. Alternatively, a malware may spuriously write subversive data into a carry-over instruction area of non-volatile memory locations, induce a reboot, and during reboot processing the subversive data in the carry-over instruction area of non-volatile memory may cause subversion of the security of the UE or computer system.

The present disclosure teaches improvements to the reboot process of UEs and computer systems and hence teaches improvements to UEs and computer systems. A variety of tactics are described for thwarting and/or mitigating security subversion malware that attempts to exploit reboot events. These various tactics may be used singly and/or in combination. In some contexts, UEs and computer systems may be collectively referred to as an execution platform.

An application on the execution platform may determine if a reboot has occurred after a power-on boot has occurred (e.g., a reboot unassociated with an encompassing power-on boot) and, if so, prevent other applications executing on the execution platform from accessing a confidential memory region or secure memory blocks. The application may be a portion of the operating system or may be an application that is launched by the operating system and/or the reboot instructions prior to execution of the other applications. The application may be referred to as a reboot security application in some contexts. Alternatively, the application may determine an identity of an application that triggered the reboot and check if the triggering application identity is included in a white list of applications. If the application that triggered the reboot is not present in the white list, the application may prevent other applications, including the triggering application, from accessing secure memory blocks. If the application that triggered the reboot is identified in the white list, normal access of the other applications to secure memory blocks is allowed (possibly mediated by other security processing or privilege enforcement processing). In an embodiment, if the application determines that a reboot unassociated with an encompassing power-on boot has occurred or that an application triggered the reboot that is not present in the white list, the application may pop-up a dialog box to a user or administrator of the execution platform prompting for permission or access blocking instructions.

Alternatively, the application may determine an identity of an application that triggered the reboot and check if the triggering application identity is included in a black list of applications. If a black listed application triggered the reboot, the application may prevent other applications, including the triggering application, from accessing secure memory blocks. If the application that triggered the reboot is not black listed, normal access of the other applications to secure memory blocks is allowed (possibly mediated by other security processing or privilege enforcement processing). In an embodiment, if the application determines that a reboot unassociated with an encompassing power-on boot has occurred or that a black listed application triggered the reboot, the application may pop-up a dialog box to a user or administrator of the execution platform prompting for permission or access blocking instructions.

In an embodiment, when an application initiates a power-on boot (i.e., a cold boot) and carry-over instructions are to be performed, the operating system or the reboot security application may present a dialog box summarizing the circumstances that an application has initiated the power-on boot, the identity of the application, and that carry-over instructions are pending execution. The dialog box may provide control inputs for the user or administrator to permit execution of the carry-over instructions or instead to not execute the carry-over instructions.

In an embodiment, after a power-on boot (i.e., a cold boot) initiated by a white listed application, if carry-over instructions are performed, extra security processing may be performed. The power-on boot, in this case, may be repeated as a second power-on boot (invoked by the operating system or by the reboot security application) that does not execute any carry-over instructions. Alternatively, a dialog box may be presented on a display of the execution platform providing the user or system administrator with a summary of the situation and identifying the application that initiated the power-on boot. The dialog box may provide controls for the use to select continued operation or to back-out the carry-over instructions followed by a power-on boot cycle. Yet other security actions may be performed before, during, or after a power-on boot cycle initiated by an application, either a white listed or a black listed application.

The dialog box may provide information about the reboot and the triggering application to assist a user or administrator choosing how to handle the event. The dialog box may provide the option of performing a power-on boot, which may provide greater confidence that subversion of security processing has not occurred. The dialog box may be referred to as a notification presented on a display in some contexts.

The application, when it determines a reboot has occurred after a power-on boot, may further determine if the reboot processed any carry-over instructions, for instance instructions that may sometimes be stored in non-volatile memory before a boot or reboot to promote completing software updates to the execution platform across a boot or reboot cycle. If no carry-over instructions were processed, the application may do nothing. If carry-over instructions were processed during the subject reboot, the application may prevent access of other applications to secure memory blocks or the application may trigger a boot (i.e., a power-on boot or cold boot). Alternatively, the application may reach out to application providers through an appropriate application programming interface (API) to validate the carry-over instructions. If the subject application provider, via the API, responds that the carry-over instructions are indeed legitimate, the application allows customary security processing for access of the other applications to secure memory blocks, otherwise the subject application may block memory access of the other applications to the secure memory blocks or trigger a boot (i.e., power-on boot or cold boot).

Figure 1:
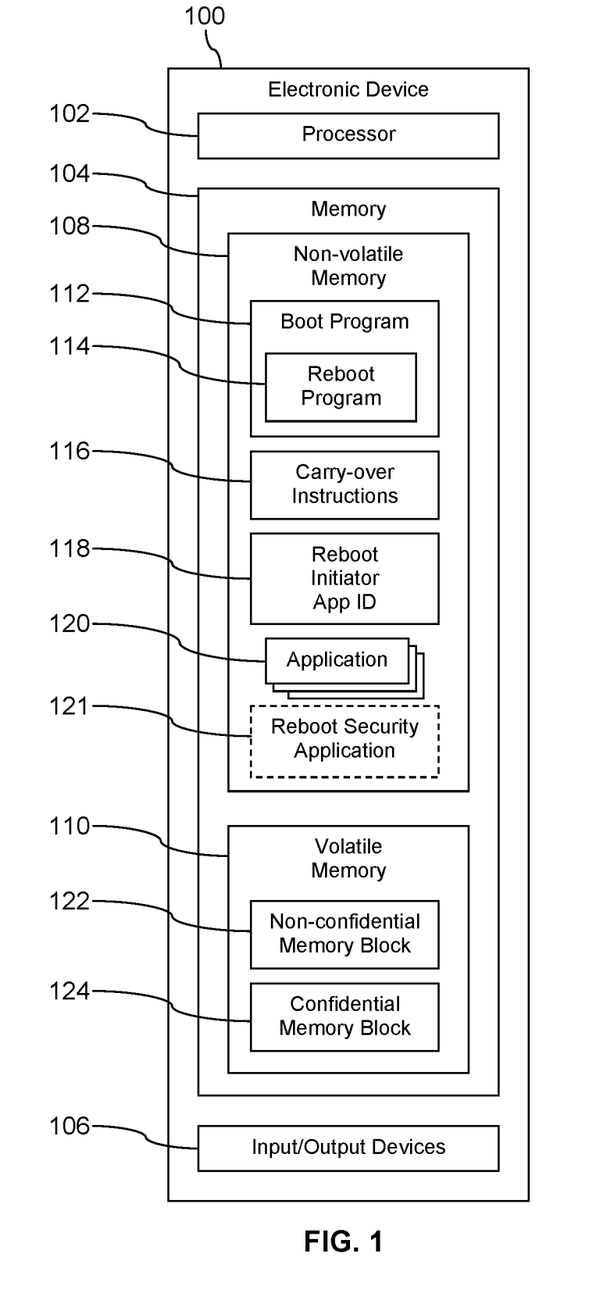
FIG. 1 is a block diagram of an electronic device according to an embodiment of the disclosure.

Turning now to FIG. 1, an electronic device 100 is described. The electronic device 100 may be a user equipment (UE) or a computer system. The device 100 may be a mobile phone, a smart phone, a personal digital assistant (PDA), a media player, a wearable computer, or a headset computer. The device 100 may be a server computer, a desktop computer, a laptop computer, a notebook computer, or a tablet computer. The device 100 may be a set top box. The device 100 may be an embedded computing system, such as a logic processor, memory, and input/output devices embedded within some larger system, for example a home appliance such as a refrigerator, a stove, a home security system; for example an industrial process control system, an automobile control system or head unit, an office printer, a remote sensing station, and other embedded systems.

In an embodiment, the device 100 comprises a processor 102, a memory 104, and one or more input and/or output devices 106. The processor 102 may comprise one or more of a microprocessor, a microcontroller, a digital signal processor (DSP), an application specific integrated circuit (ASIC), a field programmable gate array (FPGA), a complex programmable logic device (CPLD), or another logical processor component. The processor 102 may comprise a plurality of processor components, for example two microprocessors or four microprocessors. The processor 102 may comprise a mix of different types or categories of processor components, for example two microprocessors and a digital signal processor, four microprocessors and a digital signal processor, or some other combination.

The memory 104 comprises a non-volatile memory 108 and a volatile memory 110. When power is removed from the volatile memory 110, the digital values stored in the volatile memory 110 may be lost. When power is removed from the non-volatile memory 108, digital values stored in the non-volatile memory 108 are preserved. The non-volatile memory 108 may comprise a boot program 112. The boot program 112 may comprise or encompass a reboot program 114. The boot program 112 and the reboot program 114 may be considered to be a part of an operating system of the device 100. The non-volatile memory 108 may comprise an area reserved for storing carry-over instructions 116, an area reserved for storing an identity of an application that initiates a reboot 118, and a plurality of applications 120. When the device 100 is a UE, some of the applications 120 may comprise user applications, e.g., applications that a user of the UE installed after initial activation of the UE. When the device 100 is a computer system, the applications 120 may comprise computer programs that perform enterprise processing functionality or web applications or content serving applications.

The volatile memory 110 may be partitioned into non-confidential memory blocks 122 or non-secure memory blocks and confidential memory blocks 124 or secure memory blocks. In some contexts, these may be referred to as non-confidential information regions of memory and confidential information regions of memory. In an embodiment, the confidential memory blocks 124 may be part of a trusted security zone (TSZ). Trusted security zones are described further hereinafter. During boot and/or reboot operations, some of the instructions of the applications 120 may be stored or loaded into the non-confidential memory block 122. During boot and/or reboot operations, operating system software may be stored or loaded into the non-confidential memory block 122. In some cases it may be preferable to execute operating system software and application software instructions that is stored in volatile memory 110 because access may be faster (reading and writing to volatile memory 110 may be performed at a faster throughput rate because of the performance characteristics of these different kind of memory components).

It is understood that contents of the non-confidential memory block 122 may be protected or secured by an operating system executing on the device 100 in a variety of ways. For example, portions of the non-confidential memory blocks 122 may be allocated for use by the applications 120 when they are launched during boot or reboot processes (e.g., a first region of memory allocated to a first application, a second region of memory allocated to a second application, and so on), and the operating system may prevent unrelated applications 120 from accessing the portion of the non-confidential memory block 122 allocated to a different application 120 (e.g., the first application can access the first region of memory but not the second region of memory, the second application can access the second region of memory but not the first region of memory, and so on). The access by applications 120 to the portion of the non-confidential memory block 122 in which the operating system software is installed may be restricted by the operating system.

When a reboot is initiated, the operating system may invoke a reboot security application 121 to execute before executing the reboot program 114. Alternatively, this functionality may be performed by the operating system itself and/or by the reboot program 114 (e.g., looking at this in a different way, the reboot security application 121 may be a component of the operating system or a component of the reboot program 114). The reboot security application 121, the operating system, or the reboot program 114 may store an identity of one of the applications 120 that has triggered the reboot and write this into the reboot initiator application identity storage area 118 in the non-volatile memory 108. The reboot security application 121, the operating system, or the reboot program 114 may further store an indication of whether a reboot was initiated or a boot was initiated (i.e., an indication of whether a warm-boot or a cold-boot was initiated) in the non-volatile memory 108. Alternatively or in addition, the reboot security application 121, the operating system, or the reboot program 114 may store a time and date when the reboot was initiated in the non-volatile memory 108.

As the sequence of instructions in the reboot program 114 are performed, the operating system, the reboot program 114 itself, or the reboot security application 121 (in an embodiment, the reboot security application 121 may continue to execute, at least partially and a selected portion of its instructions, across the reboot cycle) analyze the circumstances and/or context of the reboot. In an embodiment, when the reboot program 114 was not performed pursuant to an encompassing boot program 112 (cold-reboot) execution, the reboot security application 121 and/or the operating system prevent applications 120 from accessing the confidential memory block 124. This access may be blocked until a full boot (power-on boot, cold boot) is performed. Access may be blocked by setting a flag in memory 104, either in non-volatile memory 108 or in volatile memory 110. When an application 120 attempts to access the confidential memory block 124, for example by executing an API call provided by the operating system to read from the confidential memory block 124, the state of the blocking flag is read and if it is active, the request to read from the confidential memory block 124 is denied by the API and/or by the operating system.

Alternatively, after the reboot program 114 instructions have been executed, the operating system or reboot program 114 may first initiate and execute the reboot security application 121—before initiating and executing the other applications 120—and the reboot security application may analyze the circumstances and/or context of the reboot and set the blocking flag described above. The reboot security application may then terminate, and the operating system or reboot instructions 114 may initiate and execute the other applications 120.

Part of the analyzing of the context of the reboot may comprise determining which application 120 initiated the reboot by reading its identity from the reboot initiator application identity 118 and comparing this to a white list of application identities. The white list may be stored in a portion of non-volatile memory 104, for example within the reboot security application 121 or elsewhere. The white list may be written to the non-volatile memory 104 from time to time as it is updated. If the application 120 that initiated the reboot does not match an entry on the white list, the reboot security application 121 or the operating system may block access to the confidential memory block 124 as described above, for example by setting a blocking flag. Alternatively, the reboot security application 121 or the operating system may invoke a boot (i.e., a power-on boot or cold boot).

Figure 2:
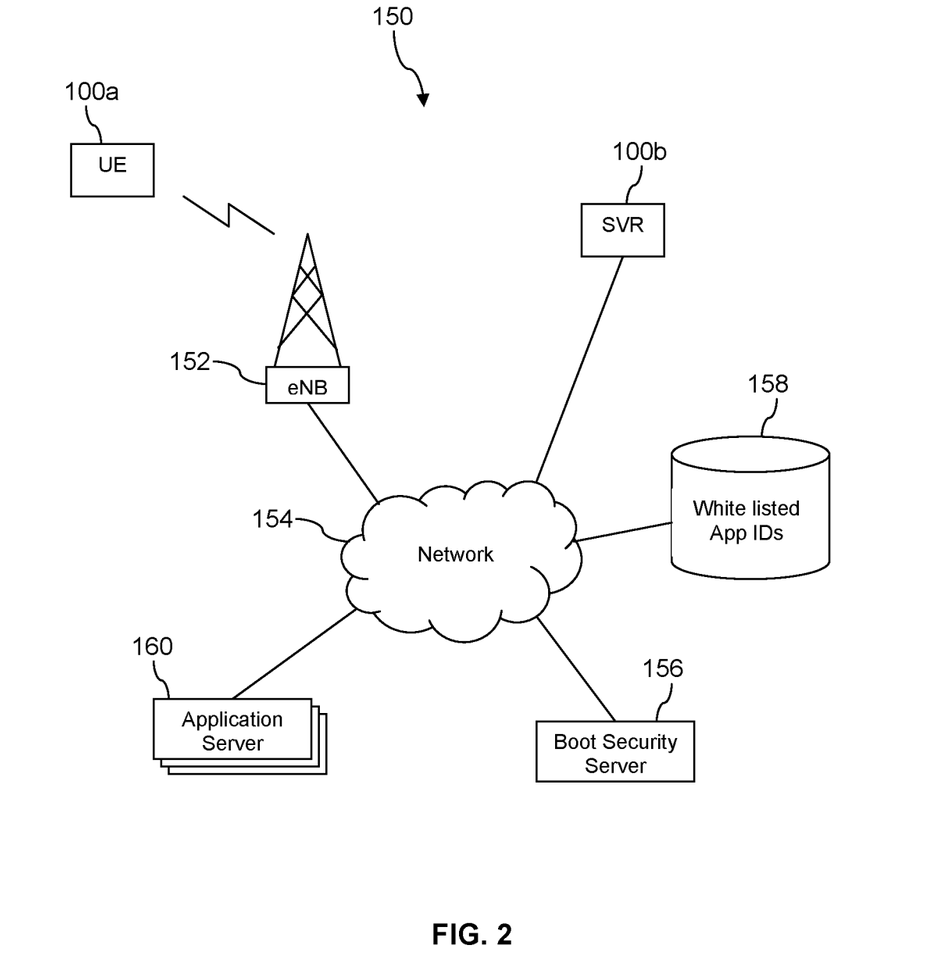
FIG. 2 is a block diagram of a communication system according to an embodiment of the disclosure.

Turning now to FIG. 2, a communication system 150 is described. In an embodiment, the system 150 comprises a first electronic device 100*a* that is a UE and/or a second electronic device 100*b* that is a server computer. The first device 100*a* communicates wirelessly with an enhanced node B (eNB) 152, a base transceiver station (BTS), or a cell tower using one of a long term evolution (LTE), a code division multiple access (CDMA), a global system for mobile communications (GSM), or a worldwide interoperability for microwave access (WiMAX) wireless communication protocol. The eNB 152 couples the first electronic device 100*a* to a network 154. The network 154 comprises one or more private communication networks, one or more public communication networks, or a combination thereof.

In an embodiment, the system 150 further comprises a boot security server 156 and a white listed application identity data store 158. The boot security server 156 may provide periodic and/or occasional updates of an application white list to electronic devices (e.g., first electronic device 100*a* and second electronic device 100*b*) via the network 154. In an embodiment, the white list may be customized to the type of electronic device 100. For example, the boot security server 156 may send a first white list to the first device 100*a* and a second white list, different from the first white list, to the second device 100*b*. The boot security server 156 may maintain different white lists for different types of electronic equipment 100 and/or different white lists for different models of the same type of electronic equipment 100. The boot security server 156 may send out white list updates as new information becomes available on an event driven or aperiodic basis. In an embodiment, the boot security sever 156 may push the updates to the electronic devices 100. In another embodiment, the electronic devices 100 may periodically pull the updates from the boot security server 156. In an embodiment, the boot security server 156 may notify the electronic devices 100 that a white list update is available, and the electronic devices 100, responsive to receiving the notification, may pull the update. If black lists are employed instead of white lists, similar updating may be performed.

With reference again to FIG. 1, another part of the analyzing of the context of the reboot may comprise determining if any carry-over instructions were stored in the carry over instructions area 116 of the non-volatile memory 108 and executed during reboot. If so, a variety of alternative actions may be taken. In an embodiment, in this circumstance the reboot security application 121 or the operating system may invoke a boot (i.e., a power-on boot or cold boot). In an embodiment, in this circumstance the reboot security application 121 or the operating system may pop-up a dialog to a user or administrator notifying of the carry-over instruction execution, notifying what application initiated the reboot, and asking what action is desired. The dialog box may provide an input control for selecting the desired action. In an embodiment, in this circumstance access by applications 120 to confidential memory blocks 124 may be blocked.

With reference now to both FIG. 1 and FIG. 2, in an embodiment, when a reboot program 114 processed carry-over instructions 116, the reboot security application 121 or the operating system may reach out via a communication interface of the input and output devices 106 to a communication network and to a server maintained by an application provider associated with the application 120 that initiated the boot to confirm the legitimacy of the reboot operation and execution of carry-over instructions, for example using an API provided by the application provider server for this purpose. Based on the response, the reboot security application 121 or the operating system may invoke a boot (i.e., a power-on boot or cold boot). For example, the electronic device 100 may establish a communication link with an application server 160 via an API to verify that carry-over instructions had been generated by the subject application on the device 100.

In some devices 100, a graphics processor unit (GPU) may be installed and its memory (e.g., memory associated with the GPU and/or memory internal to the GPU chip) may be used, in part or under some circumstances, by the processor 102 to store data and/or instructions. In an embodiment, the reboot security application 121 may invoke rebooting the GPU after a reboot of the electronic device 100.

Figure 3:
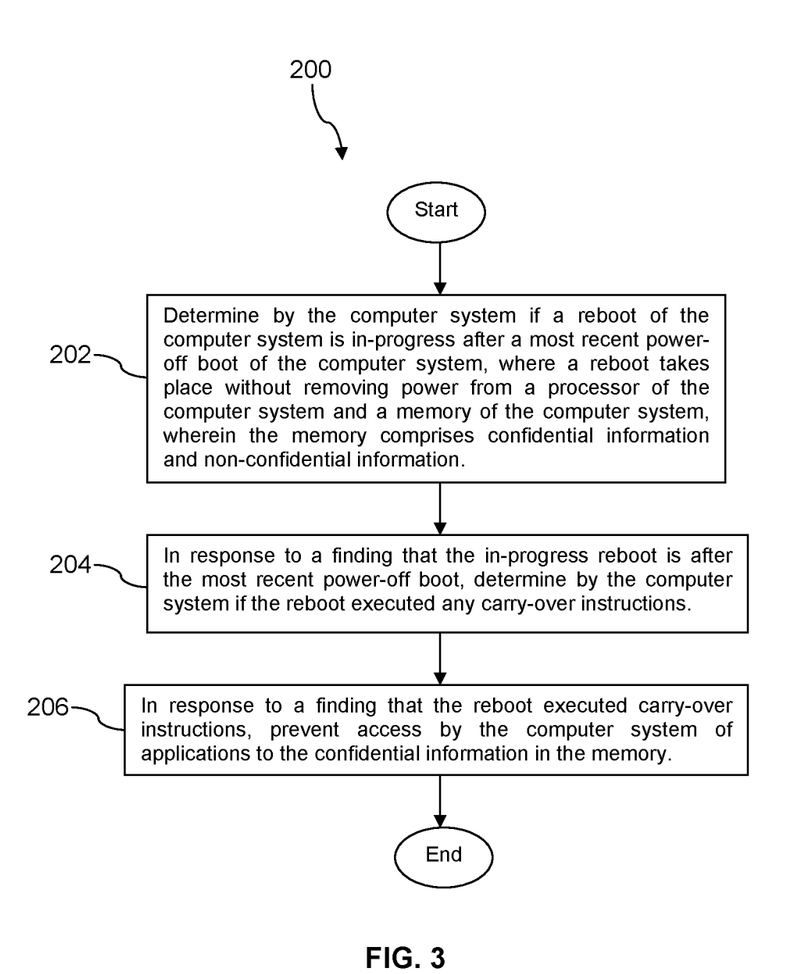
FIG. 3 is a flow chart of a method according to an embodiment of the disclosure.

Turning now to FIG. 3, a method 200 is described. At block 202, determining by a computer system if a reboot of the computer system is in-progress after a most recent power-off boot of the computer system, where a reboot takes place without removing power from a processor of the computer system and a memory of the computer system, wherein the memory comprises confidential information and non-confidential information. At block 204, in response to a finding that the in-progress reboot is after the most recent power-off boot, determining by the computer system if the reboot executed any carry-over instructions. At block 206, in response to a finding that the reboot executed carry-over instructions, preventing access by the computer system of applications to the confidential information in the memory. In an embodiment, the method 200 may comprise establishing a communication link with an application provider that supports an application on the computer system associated with the carry-over instructions; sending a query about the carry-over instructions to an application programming interface (API) supported by the application provider; and receiving a response from the application provider about the carry-over instructions, wherein the computer system prevents access to the confidential information region in the memory based on the received response.

In an embodiment, the method 200 may further comprise, in response to a finding that the in-progress reboot is after the most recent power-off boot, determining by the computer system that an application installed in the computer system initiated the reboot. In response to determining that the application initiated the reboot, method 200 may then compare an identity of the application to a white list of applications stored in the computer system and, in response to finding the identity of the application that initiated the reboot is not present in the white list, prevent access by the computer system of applications to the confidential information region in the memory. Alternatively, the method 200 may cause the computer system to perform a power-on boot (i.e., a cold boot).

A trusted security zone (TSZ) provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Figure 4:
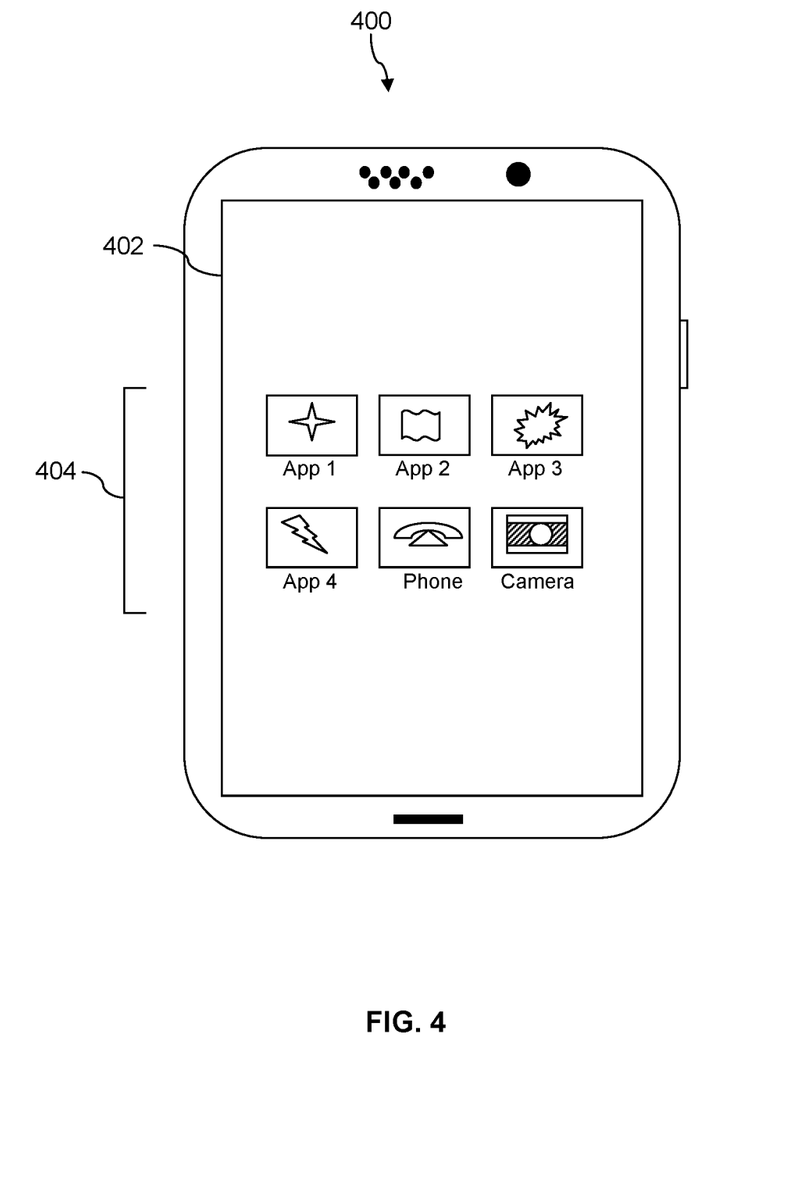
FIG. 4 is an illustration of a user equipment (UE) according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
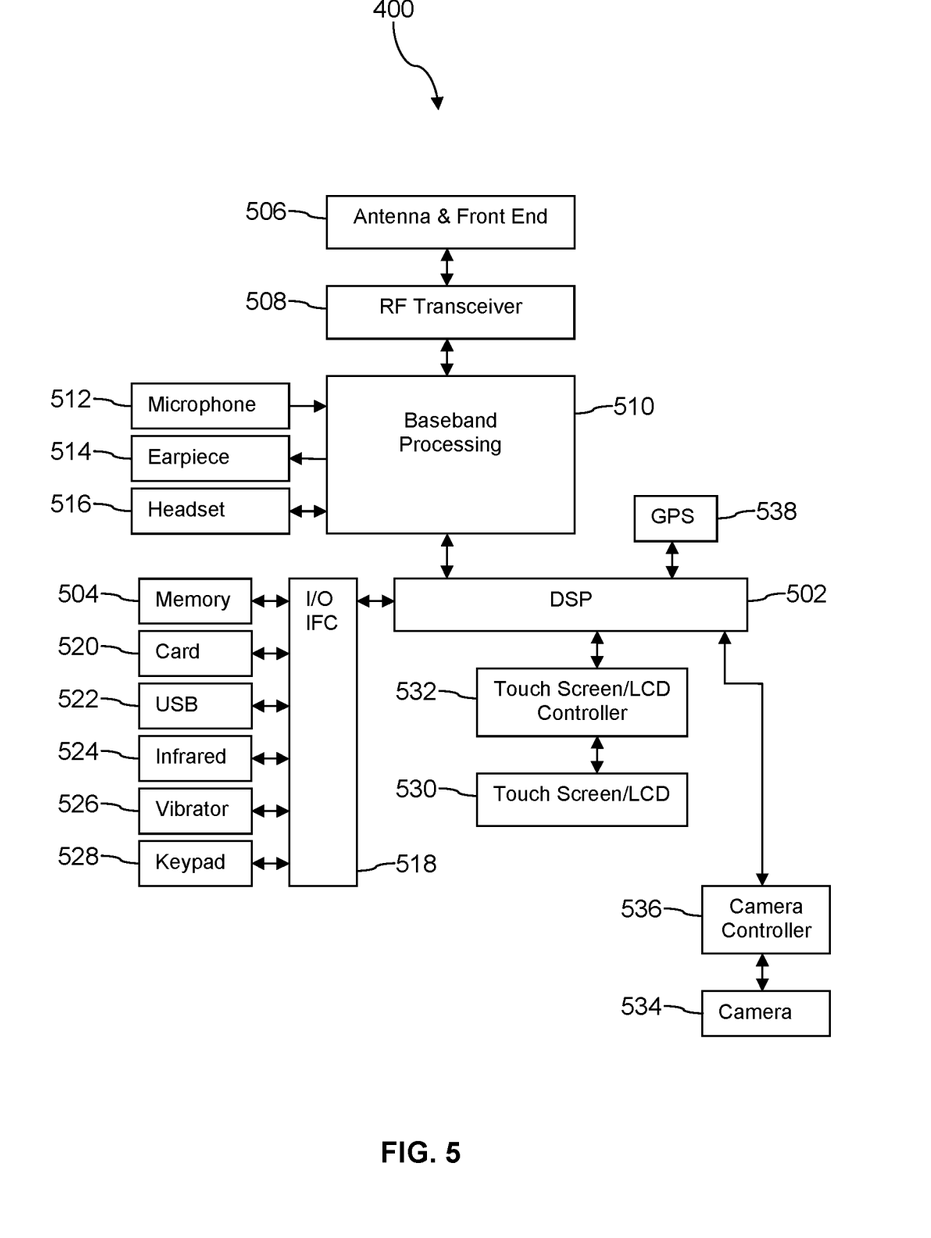
FIG. 5 is a block diagram of a hardware architecture for a UE according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
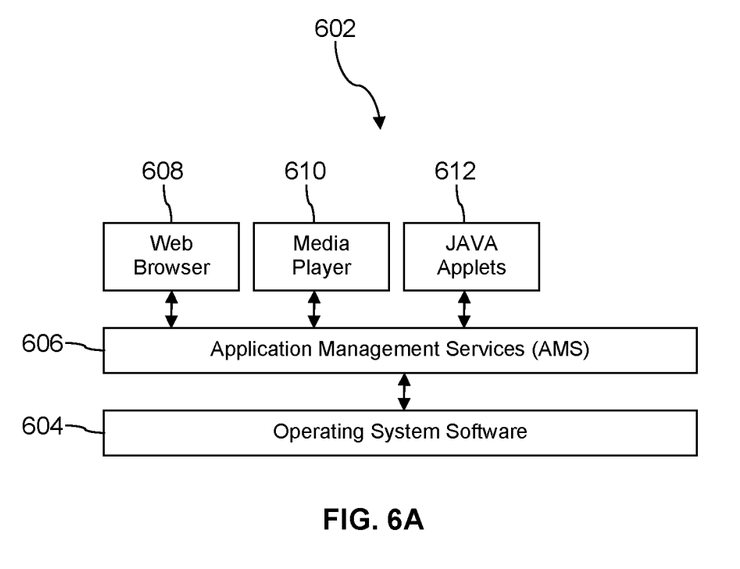
FIG. 6A is a block diagram of a software architecture for a UE according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
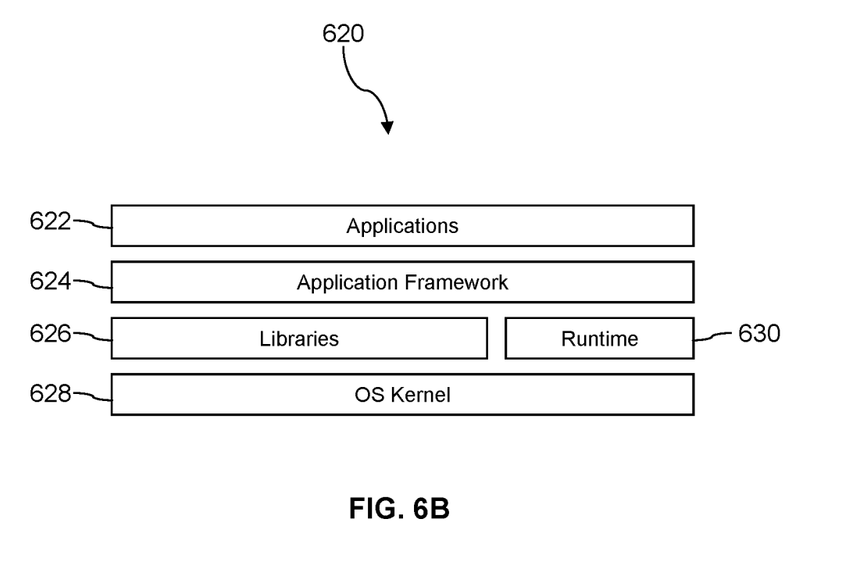
FIG. 6B is a block diagram of another software architecture for a UE according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
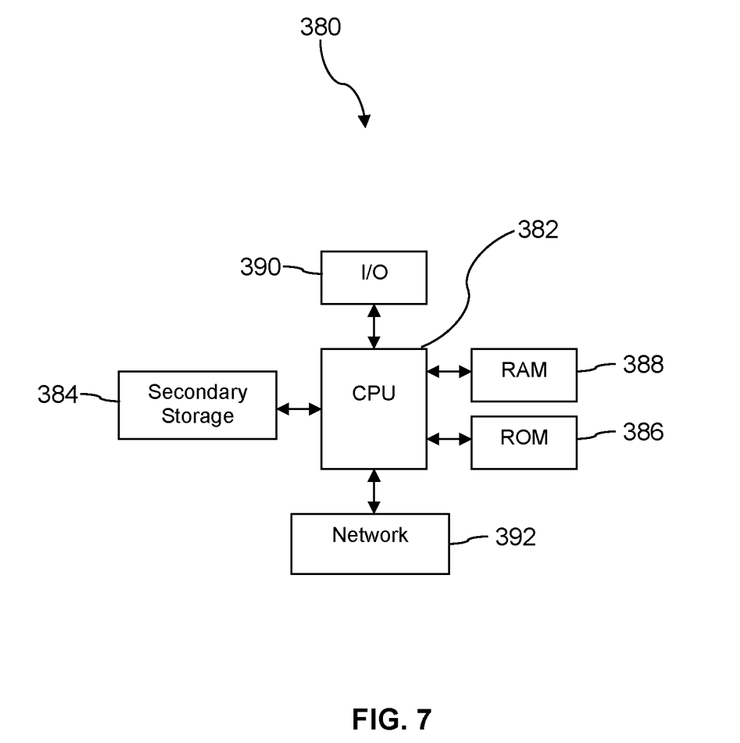
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electronic device, comprising:
a memory comprising a confidential information region and a non-confidential information region;
a processor; and
an application stored in the memory that, when executed by the processor:
  determines if a reboot has occurred after a most recent power-off boot, wherein the reboot takes place without removing power from the processor and memory,
  in response to a finding that the reboot is in progress after the most recent power-off boot, determines if the reboot executed any carry-over instructions and determines an application installed in the memory of the electronic device that initiated the reboot,
  establishes a communication link with an application provider that supports an application on the electronic device associated with the carry-over instructions,
  sends a query about the carry-over instructions to an application programming interface (API) supported by the application provider,
  receives a response from the application provider about the carry-over instructions,
  in response to determining the application that initiated the reboot, compares an identity of the application to a white list of applications stored on the electronic device, and
  in response to finding the identity of the application that initiated the reboot is not present in the white list and a finding that the reboot executed carry-over instructions, prevents access of applications to the confidential information region in the memory at least partly based on the identity of the application that initiated the reboot and the response from the application provider about the carry-over instructions.

2. The electronic device of claim 1, wherein the confidential information region in memory is stored in a trusted security zone (TSZ) where the trusted security zone provides hardware assisted security.

3. The electronic device of claim 1, wherein the application further presents a message on a display associated with the electronic device indicating that access of applications to the confidential information region is blocked.

4. The electronic device of claim 3, wherein the message provides an option for initiating a power-off boot of the electronic device to enable access of applications to the confidential information region.

5. A method of performing secure computing on a computer system, comprising:
determining by the computer system if a reboot of the computer system is in-progress after a most recent power-off boot of the computer system, wherein the reboot takes place without removing power from a processor of the computer system and a memory of the computer system, wherein the memory comprises a confidential information region and a non-confidential information region;
in response to a finding that the reboot is in-progress after the most recent power-off boot, determining by the computer system if the reboot executed any carry-over instructions and determining by the computer system that an application installed in the computer system initiated the reboot;
establishing a communication link with an application provider that supports an application on the computer system associated with the carry-over instructions;
sending a query about the carry-over instructions to an application programming interface (API) supported by the application provider;
receiving a response from the application provider about the carry-over instructions;
in response to determining that the application initiated the reboot, comparing an identity of the application to a white list of applications stored in the computer system; and
in response to a finding that the reboot executed carry-over instructions and to finding the identity of the application that initiated the reboot is not present in the white list, preventing access by the computer system of applications to the confidential information region in the memory at least partly based on the identity of the application that initiated the reboot and the response from the application provider about the carry-over instructions.

6. The method of claim 5, wherein the confidential information region is a trusted security zone (TSZ) that provides hardware assisted security.

7. The method of claim 5, further comprising:
in response to finding the identity of the application that initiated the reboot is not present in the white list, causing the computer system to perform a power-on boot.

8. The method of claim 5, wherein the computer system is one of a server computer, a laptop computer, a tablet computer, or a notebook computer.

9. The method of claim 5, wherein the computer system is one of a mobile phone, a personal digital assistant (PDA), a media player, a wearable computer, or a headset computer.

10. An electronic device, comprising:
a memory comprising a confidential information region and a non-confidential information region;
a processor; and
an application stored in the memory that, when executed by the processor:
  determines if a reboot has occurred after a most recent power-off boot, wherein the reboot takes place without removing power from the processor and memory,
  in response to determining that the reboot occurred after the most recent power-off boot, determines an identity of an application that initiated the reboot and determines if the reboot executed any carry-over instructions,
  compares the identity of the application that initiated the reboot to a white list of application identities,
  establishes a communication link with an application provider that supports an application on the electronic device associated with the carry-over instructions,
  sends a query about the carry-over instructions to an application programming interface (API) supported by the application provider, receives a response from the application provider about the carry-over instructions, and in response to determining that the identity of the application is not present in the white list and based on the response from the application provider about the carry-over instructions, prevents access of applications to the confidential information region in the memory.

11. The electronic device of claim 10, where in the confidential information region is a trusted security zone (TSZ) that provides hardware assisted security.

12. The electronic device of claim 10, wherein the electronic device is one of a mobile phone, a personal digital assistant (PDA), a media player, a wearable computer, or a headset computer.

13. The electronic device of claim 10, wherein the electronic device is one of a server computer, a laptop computer, a tablet computer, or a notebook computer.

14. The electronic device of claim 10, wherein the electronic device receives updates to the white list of application identities.

15. The electronic device of claim 10, wherein the application causes the electronic device to perform a power-on boot in response to determining that the identity of the application is not present in the white list.

16. The electronic device of claim 10, wherein the application further presents a notification on a display associated with the electronic device announcing that access of applications to the confidential information region is being blocked.

* * * * *